United States Patent
Feng et al.

(10) Patent No.: US 8,582,243 B2
(45) Date of Patent: Nov. 12, 2013

(54) SUSPENSION WITH SUPPORTING PIECES, HEAD GIMBAL ASSEMBLY AND DISK DRIVE UNIT WITH THE SAME

(75) Inventors: Xianwen Feng, DongGuan (CN); Kun Yi, DongGuan (CN); Duanxin Li, DongGuan (CN)

(73) Assignee: SAE Magentics (H.K.) Ltd., Hong Kong (CN)

( * ) Notice: Subject to any disclaimer, the term of this patent is extended or adjusted under 35 U.S.C. 154(b) by 143 days.

(21) Appl. No.: 13/064,623

(22) Filed: Apr. 4, 2011

(65) Prior Publication Data

US 2012/0170150 A1   Jul. 5, 2012

(30) Foreign Application Priority Data

Jan. 5, 2011   (CN) .......................... 2011 1 0000985

(51) Int. Cl.
*G11B 17/02*   (2006.01)

(52) U.S. Cl.
USPC ....................................................... 360/245.3

(58) Field of Classification Search
USPC .......... 360/245.3, 264.2, 265.9, 254.1, 294.4, 360/245.9, 245.8, 244.1, 265.7, 265.1
See application file for complete search history.

(56) References Cited

U.S. PATENT DOCUMENTS

| | | | |
|---|---|---|---|
| 6,025,988 A * | 2/2000 | Yan ........................... | 361/679.37 |
| 6,809,905 B2 * | 10/2004 | Kilmer ....................... | 360/264.2 |
| 7,595,963 B1 * | 9/2009 | Chen et al. ................. | 360/245.9 |
| 7,768,741 B2 * | 8/2010 | Feng ......................... | 360/125.03 |
| 2001/0001588 A1 * | 5/2001 | Matz ......................... | 360/245.9 |
| 2002/0051323 A1 * | 5/2002 | Rancour et al. ............ | 360/245.3 |
| 2004/0233578 A1 * | 11/2004 | Gao ............................. | 360/125 |
| 2005/0047023 A1 * | 3/2005 | Childers et al. ............ | 360/245.9 |
| 2007/0253115 A1 * | 11/2007 | Yao et al. ................... | 360/294.4 |
| 2007/0268623 A1 * | 11/2007 | Feng .............................. | 360/126 |
| 2007/0279807 A1 * | 12/2007 | Kobayashi et al. ......... | 360/264.2 |
| 2009/0080111 A1 * | 3/2009 | Yao et al. ................... | 360/234.5 |
| 2009/0290263 A1 * | 11/2009 | Yao et al. ................... | 360/294.4 |
| 2011/0090600 A1 * | 4/2011 | Feng .......................... | 360/245.3 |

* cited by examiner

*Primary Examiner* — Allen T Cao
(74) *Attorney, Agent, or Firm* — Nixon & Vanderhye PC (57) ABSTRACT

A suspension for a HGA comprises a flexure having a suspension tongue arranged for supporting a slider, which comprising a stainless steel layer and a dielectric layer formed thereon. The dielectric layer has a top surface and bottom surface, a plurality of bonding pads are formed on the top surface at a leading portion of the suspension tongue and arranged for connecting with the slider, and at least two separate supporting pieces are formed on the bottom surface and located at a corresponding position with the bonding pads, thereby releasing stress generated on the bonding pads. The invention also discloses a HGA and a disk drive unit with the same. The invention can release the stress generated on the bonding pads of the suspension, reduce the temperature impact to the suspension, and in turn, reduce thermal crown change of the slider, thereby improving the reading and writing performance.

11 Claims, 11 Drawing Sheets

| Comparison of crown change of slider between the prior art and the invention at 55°C |||||
|---|---|---|---|---|---|
| item | Prior art | Prior art | Embodiment 1 of invention | Embodiment 2 of invention | Embodiment 3 of invention |
| Slider type | Pemto | U-Pemto | U-Pemto | U-Pemto | U-Pemto |
| Crown change (nm) | 0.41 | 0.71 | 0.44 | 0.34 | 0.32 |

SUSPENSION WITH SUPPORTING PIECES, HEAD GIMBAL ASSEMBLY AND DISK DRIVE UNIT WITH THE SAME

This application claims the benefit of Chinese Patent Application No. 201110000985.4, filed 5 Jan. 2011, the entire contents of which is hereby incorporated by reference in this application.

FIELD OF THE INVENTION

The present invention relates to information recording disk drive devices and, more particularly, to a suspension having a suspension tongue with supporting pieces, head gimbal assembly (HGA) and disk drive unit with the same.

BACKGROUND OF THE INVENTION

Figure 1A:
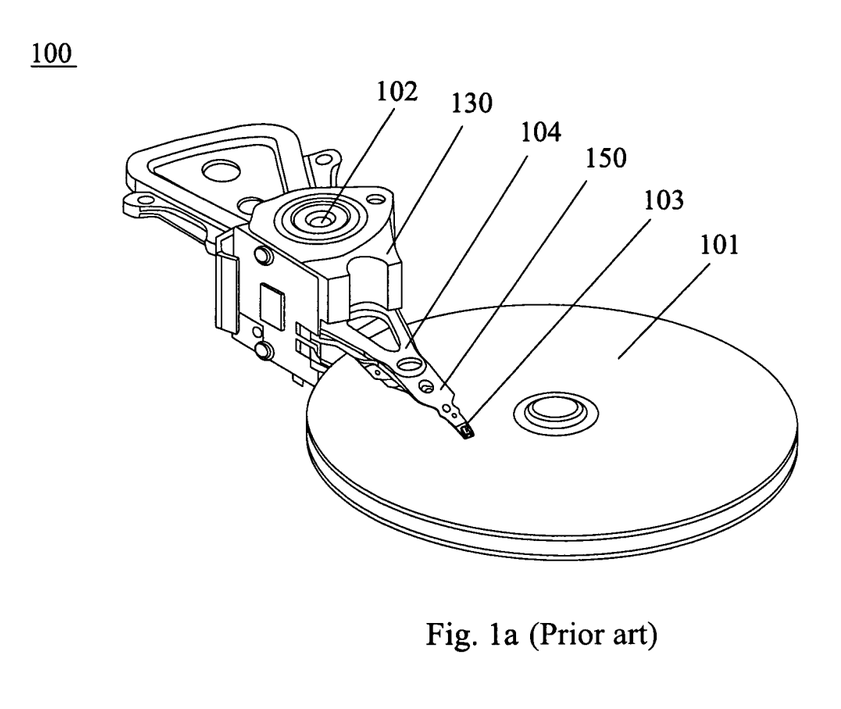
FIG. 1a is a perspective view of a conventional disk drive unit.

Hard disk drives are common information storage devices. Referring to FIG. 1a, a conventional disk drive 100 essentially consists of a series of rotatable disks 101 mounted on a spindle, and a Head Stack Assembly (HSA) 130 which is rotatable about an actuator arm axis 102 for accessing data tracks on disks during seeking. The HSA 130 includes at least one arm 104 and HGA 150.

Figure 1B:
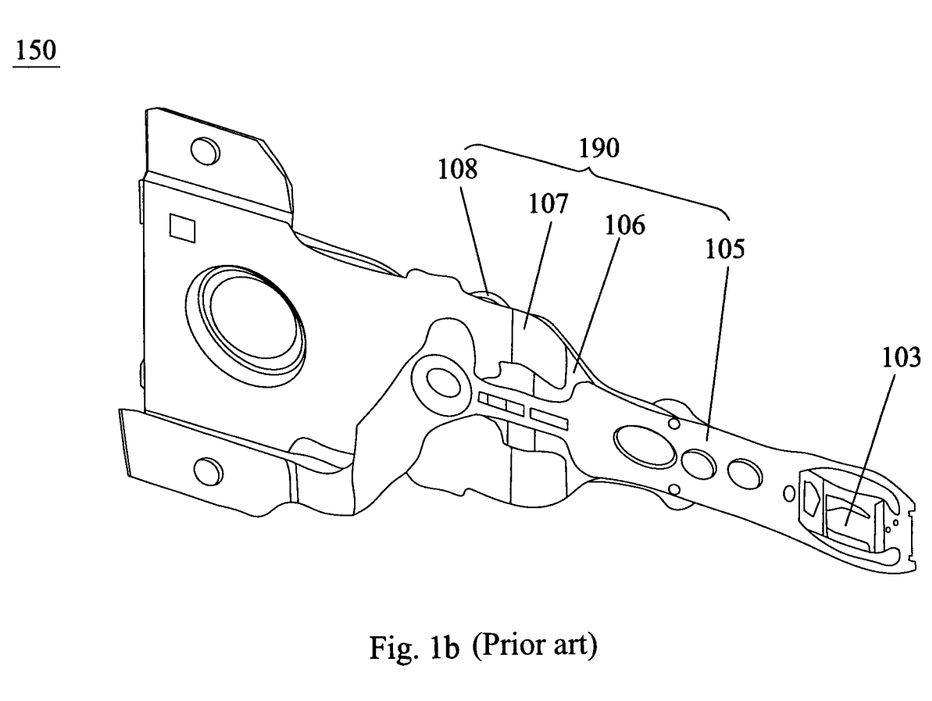
FIG. 1b is a perspective view of a conventional HGA.

Referring to FIG. 1b, the HGA 150 includes a slider 103 having a reading/writing transducer imbedded therein, a suspension 190 to load or suspend the slider 103 thereon. As illustrated, the suspension 190 includes a load beam 106, a base plate 108, a hinge 107 and a flexure 105, all of which are assembled together.

Figure 1C:
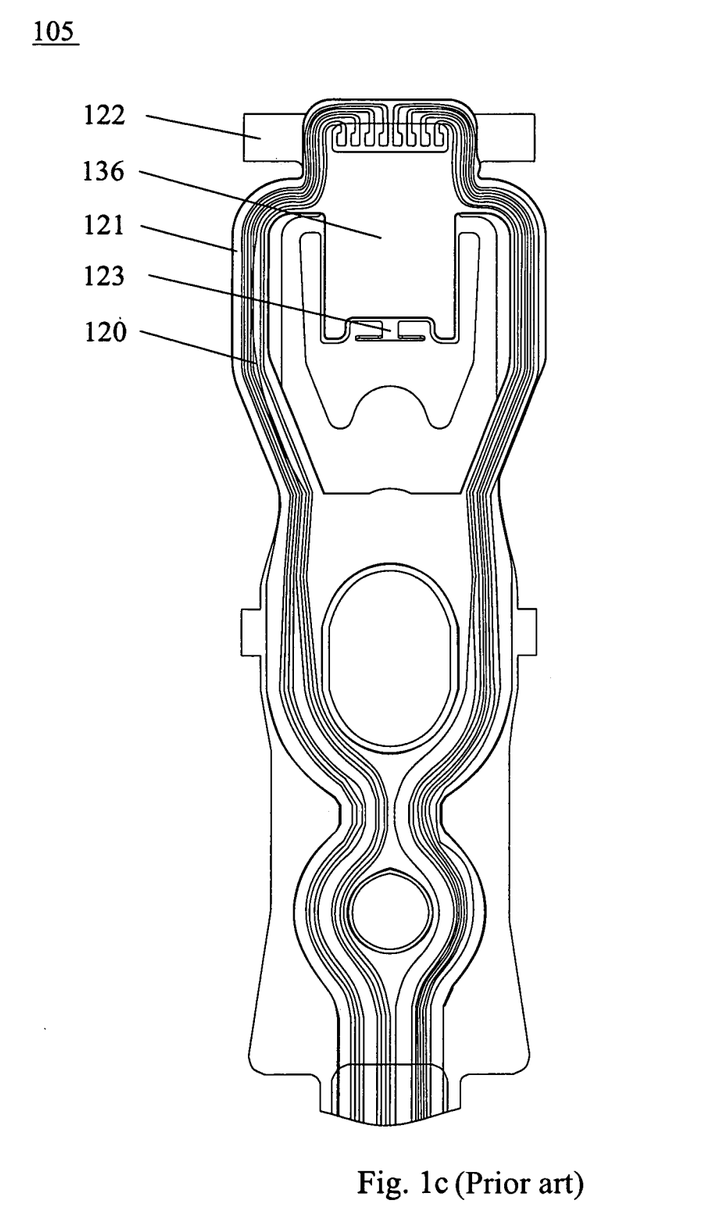
FIG. 1c is a partial top plan view of a flexure of the HGA shown in FIG. 1b.

FIG. 1c shows a more detailed structure of the flexure 105. As illustrated in the figure, a plurality of suspension traces 120 is formed on the flexure 105 along length direction thereof. One end of the suspension traces 120 is electrically connected to a preamplifier (not shown), and the other end thereof extends into a suspension tongue 136. Concretely, the suspension tongues 136 locates at the leading portion of the flexure 105, which adapts for supporting the slider 103 directly. The flexure 105 further includes a pair of struts 121 extending from two lateral sides of the suspension tongue 136, so as to support the suspension tongue 136 at the center section thereof. The leading end of the suspension tongue 136 is partially supported by a pair of protrusions 122, and the tailing end of the suspension tongue 136 configures a limiter 123 for stably holding the slider 103.

Figure 1D:
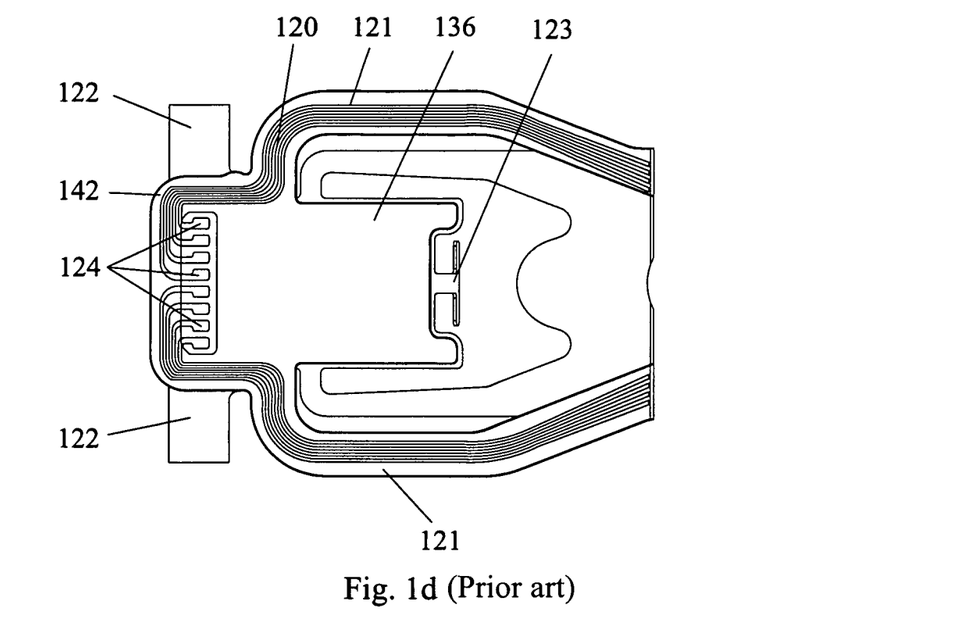
FIG. 1d is a partial detailed plan view of the suspension tongue shown in FIG. 1c.
Figure 1E:
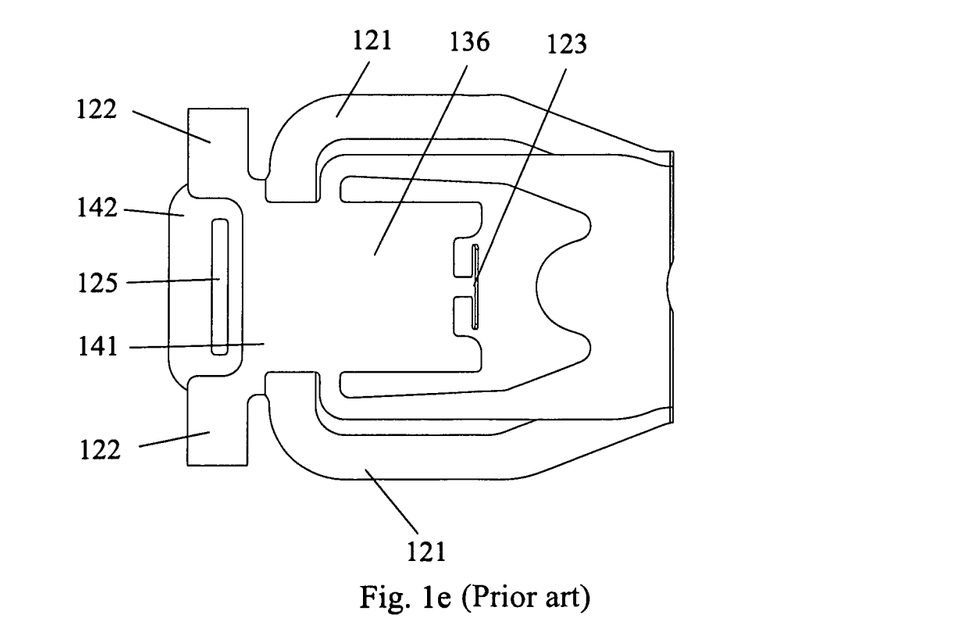
FIG. 1e is a bottom view of the suspension tongue shown in FIG. 1d.

As shown in FIG. 1d-1e, the flexure 105 is a laminated structure which includes a stainless steel layer 141 and a polyimide layer 142 formed thereon and a cover layer (not shown). The suspension traces 120 are formed on the polyimide layer 142 at the top surface thereof, which are covered by the cover layer. Commonly, the cover layer is made of copper, so as to protect the suspension traces 120. A plurality of bonding pads 124 are formed on the polyimide layer 142 at the bottom surface thereof at the leading end of the suspension tongue 136, which connect with the suspension trace 120 and bond with the leading edge of the slider 103 for electrical connection. Commonly, the bonding pads 124 of the suspension tongue 136 and the slider 103 are securely fixed by a solder ball bonded therebetween. As a result, a high temperature is utilized while bonding the solder ball. Thus, the temperature of the bonding pad 124 is quite high so that the polyimide layer 142 may be damaged potentially. Basing on this case, at the direct backside of the bonding pads 124, a supporting piece 125 made of stainless steel is formed on the polyimide layer 142 at the bottom surface, which supports the bonding pads 124 rearwards. As a result, the supporting piece 125 protects the suspension tongue 136 under the thermal bonding condition with a high temperature.

In a common disk drive unit, the slider flies only approximately a few micro-inches above the surface of the rotating disk. Generally, the flying height of the slider is considered as one of the most critical parameters affecting the disk reading and writing performances. More concretely, a relatively small flying height allows the transducer imbedded in the slider to achieve a greater read/writing resolution between different data bit locations on the disk surface, thus improving data storage capacity of the disk. Thus, it is desired that the slider has a small flying height to achieve a higher data storage capacity.

Meanwhile, it is strongly expected that the flying height be kept constant all the time regardless of variable flying conditions, since great variation of flying height will deteriorate reading/writing performance of the slider. However, the stability of the flying slider is hard to control and maintain, since it is easy to be effected by the external environment, such as temperature, stress, impact and the like.

However, with the mentioned-above design of the supporting piece 125, the whole supporting piece 125 behind the bonding pads 124 limits the stress releasing which is generated by bonding the slider 103 with the bonding pads 124. As a result, stress is gathered on the suspension tongue 136, then will trigger the slider 103 formed thereon. Thus, the flying height of the slider 103 is very unstable, which deteriorates reading/writing performance of the slider 103.

Figure 1F:
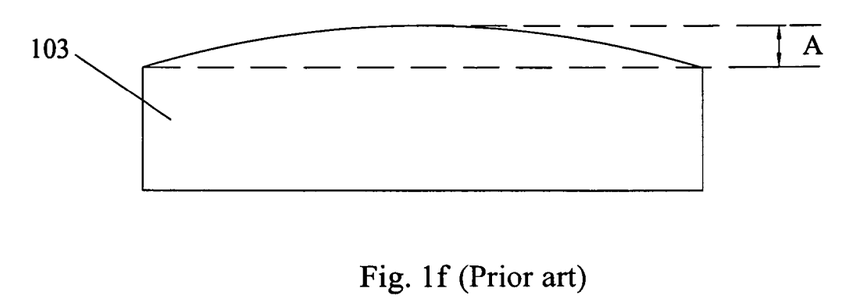
FIGS. 1f-1g show two crown changes of slider at the room temperature and at 55 degree respectively.
Figure 1G:
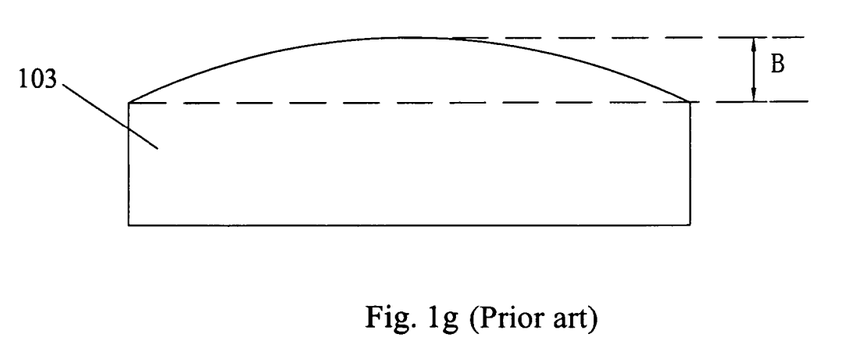

Another important index of the slider is thermal crown change. As shown in FIG. 1f-1g, at the room temperature, a little crown change A generates on the slider, and a great crown change B generates at 55 degree. That's because the bonding pads 124 between the slider 103 and the suspension tongue 136 will expand under the high temperature condition, and the stress generated fails to be released, which causes the slider to generate the great crown change. And the crown change of slider varies with the temperature variation which tremendously affects the flying characteristic of the slider, and impacts the reading and writing ability of the slider in turn, finally impacts the dynamic reliability performance of the disk drive unit.

Furthermore, the thinner slider will aggravate the thermal crown change. The types of slider used recently include the conventional thicker Pico slider (length=1.25 mm, width=1.00 mm, height=0.3 mm), Pemto slider (length=1.235 mm, width=0.7 mm, height=0.23 mm), U-Pemto slider (length=1.235 mm, width=0.7 mm, height=0.18 mm) and Femto slider (length=0.85 mm, width=0.7 mm, height=0.23 mm) which have much thinner size. Nowadays, the thinner slider with smaller cubage is popular and becomes the main trend, however, some drawbacks generate at the same time. For example, when the thinner slider, such as the U-Pemto and Femto sliders are mounted on the suspension tongue, flying height thereof is much hard to control and very unstable under the unstable external environment. And the thermal crown change of the thinner slider is much greater under the thermal condition. As a result, the reading and writing ability of the slider is weakened and, in turn, the dynamic reliability performance of the disk drive unit is reduced.

Thus, there is a need for an improved suspension adapted for the thinner slider, which can release the stress generated between a slider and the bonding pad of the suspension, reduce the temperature impact to the suspension, and reduce thermal crown change of the slider mounted thereon.

SUMMARY OF THE INVENTION

One aspect of the present invention is to provide a suspension adapted for the thinner slider, which can release the stress generated on the bonding pads of the suspension, reduce the temperature impact to the suspension, and in turn, reduce thermal crown change of the slider, thereby improving the reading and writing performance.

Another aspect of the present invention is to provide a HGA with a suspension which can release the stress generated on the bonding pads of the suspension, reduce the temperature impact to the suspension, and in turn, reduce thermal crown change of the slider, thereby achieving stable writing and reading of data.

Yet another aspect of the present invention is to provide a disk drive unit with a HGA which can release the stress generated on the bonding pads of the suspension, reduce the temperature impact to the suspension, and in turn, reduce thermal crown change of the slider, thereby improving the dynamic reliability performance of the disk drive unit.

To achieve above objectives, a suspension for a HGA comprises a flexure having a suspension tongue arranged for supporting a slider, which comprising a stainless steel layer and a dielectric layer formed thereon. And the dielectric layer has a top surface and bottom surface, a plurality of bonding pads are formed on the top surface at a leading portion of the suspension tongue and arranged for connecting with the slider, and at least two separate supporting pieces are formed on the bottom surface and located at a corresponding position with the bonding pads, thereby releasing stress generated on the bonding pads.

Preferably, the amount of the supporting piece is from 2 to 8.

Preferably, the supporting piece is made of stainless steel.

Preferably, the dielectric layer is made of polyimide.

Preferably, the stainless steel layer is formed on the bottom surface of the dielectric layer.

A HGA comprises a slider and a suspension comprising a flexure with a suspension tongue for supporting the slider. The flexure comprises a stainless steel layer and a dielectric layer formed thereon. And the dielectric layer has a top surface and bottom surface, a plurality of bonding pads are formed on the top surface at a leading portion of the suspension tongue and arranged for connecting with the slider, and at least two separate supporting pieces are formed on the bottom surface and located at a corresponding position with the bonding pads, thereby releasing stress generated on the bonding pads.

Preferably, the amount of the supporting piece is from 2 to 8.

Preferably, the supporting piece is made of stainless steel.

Preferably, the dielectric layer is made of polyimide.

Preferably, the stainless steel layer is formed on the bottom surface of the dielectric layer.

A disk drive unit comprises a HGA including a slider and a suspension that supports the slider; a drive arm connected to the HGA; a disk; and a spindle motor operable to spin the disk. The suspension comprises a flexure having a suspension tongue arranged for supporting the slider. And the flexure comprises a stainless steel layer and a dielectric layer formed thereon. And the dielectric layer has a top surface and bottom surface, a plurality of bonding pads are formed on the top surface at a leading portion of the suspension tongue and arranged for connecting with the slider, and at least two separate supporting pieces are formed on the bottom surface and located at a corresponding position with the bonding pads, thereby releasing stress generated on the bonding pads.

In comparison with the prior art, as the several isolated and separate supporting pieces are set, a stress generated during bonding the slider and the bonding pads of the suspension tongue will be dispersed on the separate supporting pieces, thus, the stress is even released and reduced, which reduces a thermal deformation of the suspension tongue. Meanwhile, when the temperature varies, the stress generated by the expansion of the bonding pads between the slider and the suspension tongue will be released via the several separate supporting pieces. Therefore, a crown change of the slider is reduced accordingly. Thereby, the flying stability of the slider is improved, and the reading/writing characteristics of the slider and the performance of entire disk drive unit are improved finally.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views. As indicated above, the invention is directed to a suspension for a HGA of a disk drive unit, which includes a flexure having at least two separate supporting pieces formed on the bottom surface of the dielectric layer and located at a corresponding position with the bonding pads. By providing the several separate supporting pieces at the backside of the bonding pads, stress generated on the bonding pads of the suspension can be released, and temperature impact to the suspension tongue is reduced, and in turn, thermal crown change of the slider is reduced, thereby improving the reading and writing performance of the slider and the dynamic reliability performance of the disk drive unit.

Figure 2:
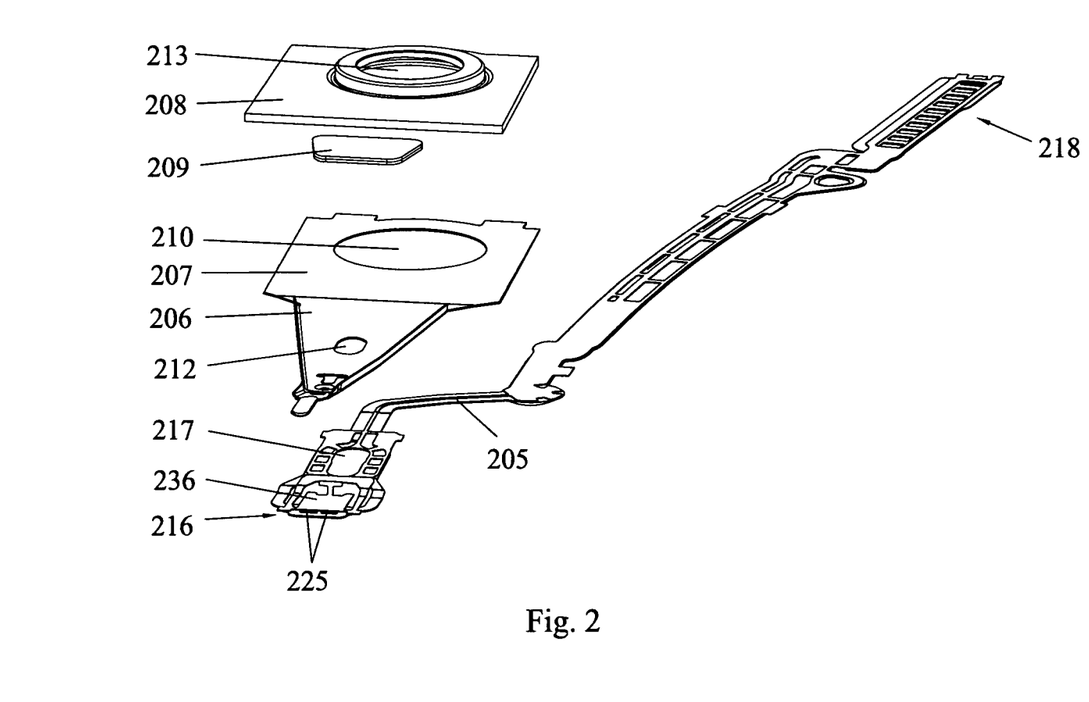
FIG. 2 is an exploded perspective view of a suspension seen from the bottom surface thereof according to an embodiment of the present invention.

FIG. 2 shows an embodiment of a suspension of the present invention. As illustrated in FIG. 2, a suspension 290 including a load beam 206, a base plate 208, a hinge 207 and a flexure 205, all of which are assembled with each other.

Figure 10:
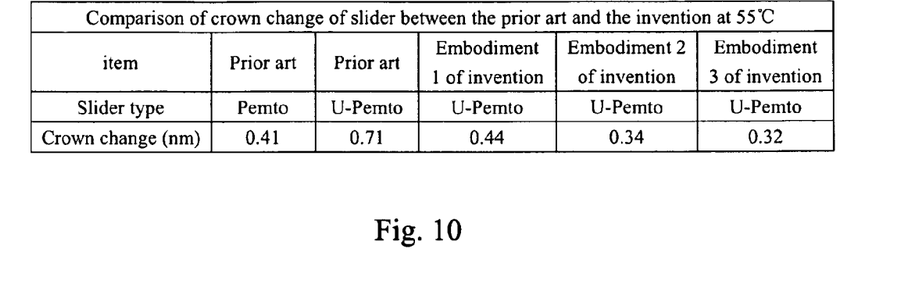
FIG. 10 is a comparing table of the crown change of slider of HGA between the prior art and the present invention.

Referring to FIG. 2 and FIG. 10, the load beam 206 is used to transfer load forces to the flexure 205 and a slider mounted on the flexure 205. Any suitable rigid material such as stainless steel may be used to form the load beam 206 such that the load beam 206 has sufficient stiffness to transfer the load forces to the flexure 205. The load beam 206 is connected to the base plate 208 by the hinge 207. A locating hole 212 is formed on the load beam 206 for aligning itself with the flexure 205. A dimple (not shown) is formed on the load beam 206 to support the flexure 205 at a position corresponding to a center of the slider. By this engagement of the dimple with the flexure 205, the load forces can be transferred to the slider uniformly. A damper 209 is formed on the load beam 206 to reduce the vibration of the load beam 206.

The base plate 208 is used to enhance structure stiffness of the whole suspension 290 and may be made of rigid material such as stainless steel. A mounting hole 213 is formed on one end of the base plate 208 for mounting the whole suspension 290 to a motor arm of a disk drive unit.

The hinge 207 has a mounting hole 210 formed on its one end corresponding to the mounting hole 213 of the base plate 208, and the hinge 207 is partially mounted to the base plate 208 with the mounting holes 210, 213 aligned with each other. The hinge 207 and the base plate 208 may be mounted together by laser welding at a plurality of pinpoints (not shown) distributed on the hinge 207.

Figure 3:
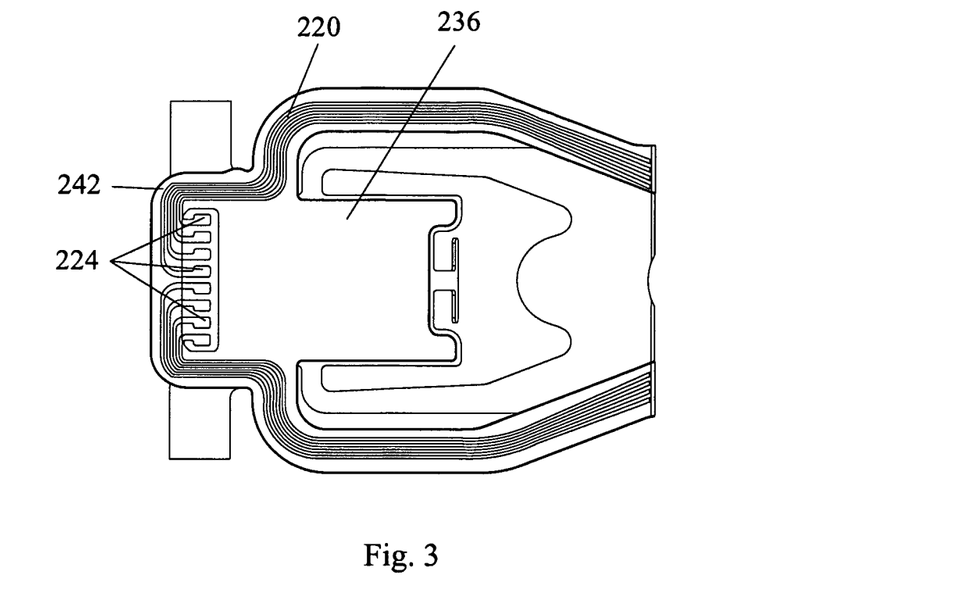
FIG. 3 is an enlarged partial plan view of the flexure according to a first embodiment of the present invention.

As shown in FIGS. 2-3, the flexure 205 is made of flexible material and runs from the hinge 207 to the load beam 206. The flexure 205 has a tail portion 218 adjacent the hinge 207 and a top portion 216 adjacent the load beam 206. A locating hole 217 is formed on the top portion 216 of the flexure 205 and is aligned with the locating hole 212 of the load beam 206. The perfect alignment between the locating holes 217 and 212 can assure a high assembly precision between the flexure 205 and the load beam 206. A suspension tongue 236 is provided at the top portion 216 of the flexure 205 to support the slider (not shown here) thereon. The tail portion 218 of the flexure 205 adapts for establishing electrical connection with a flexible printed cable (not shown), thus connects with a control servo. The flexure 205 has a plurality of suspension traces 220 which run from the top portion 216 to the tail portion 218 formed thereon.

Figure 4:
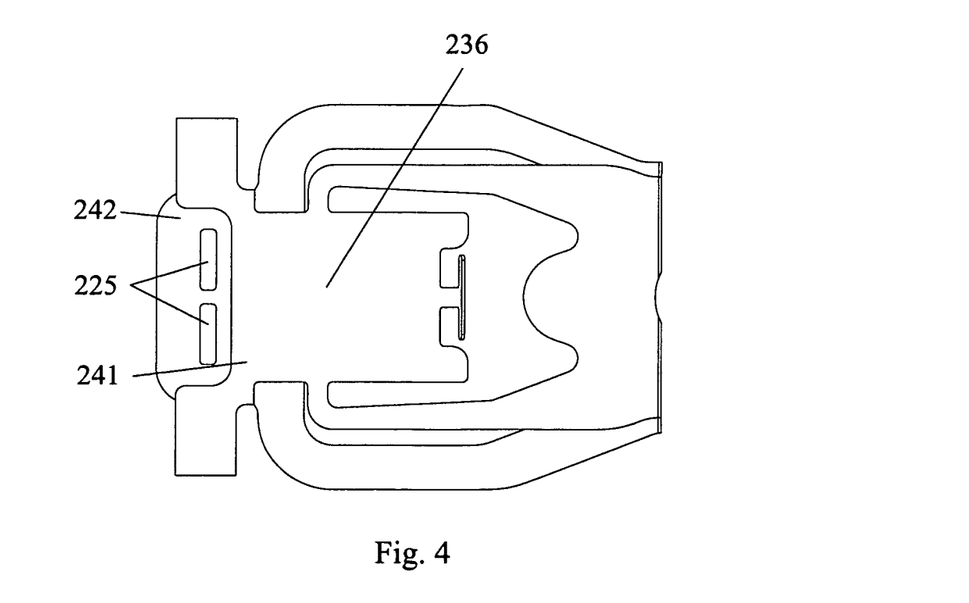
FIG. 4 is an enlarged partial bottom view of the flexure shown in FIG. 3.

FIGS. 3-4 illustrate a partial structure of the flexure 205, which show the top view and a bottom view of the suspension tongue 236 according to the first embodiment of the present invention. As shown in FIG. 3, the flexure 205 is a laminated structure which includes a stainless steel layer 241 and a dielectric layer 242 that is laminated with the stainless steel layer 241. Preferably, the dielectric layer 242 is made of polyimide. In the instant embodiment, a plurality of bonding pads 224, such as eight, is formed on the dielectric layer 242 at the top surface thereof, and two separate supporting pieces 225 are formed on the dielectric layer 242 at the bottom surface thereof. And the laminated structure further comprises a cover layer 243 made of copper formed on the suspension traces 220. The bonding pads 224 are electrically connected with the suspension traces 220 and adapted to electrically connect to the slider of the HGA by solder ball. Concretely, the two separate supporting pieces 225 are configured at direct backside of the bonding pads 224 for supporting, namely they are mounted on the dielectric layer 242 at the bottom surface thereof and at the corresponding position with the bonding pads 224. It should be notice that the supporting pieces 225 are isolated and separate each other. Preferably, the supporting pieces 225 are made of stainless steel.

As a result, on the one hand, while bonding the slider with the bonding pads 224 via solder balls, the supporting pieces 225 can prevent the dielectric layer 242 from damaging under the thermal condition. On the other hand, as the supporting pieces 225 are isolated and separate, a stress generated during bonding the slider and the bonding pads 224 of the suspension tongue 236 will be dispersed on the separate supporting pieces 225, thus, the stress is released and reduced, which reduces a thermal deformation of the suspension tongue 236. Meanwhile, when the temperature varies, the stress generated by the expansion of the bonding pads 224 between the slider and the suspension tongue 236 will be released via the several separate supporting pieces 225. Therefore, a crown change of the slider is reduced accordingly. Thereby, the flying stability of the slider is improved, and the reading/writing characteristics of the slider and the performance of entire disk drive unit are improved finally.

Figure 5:
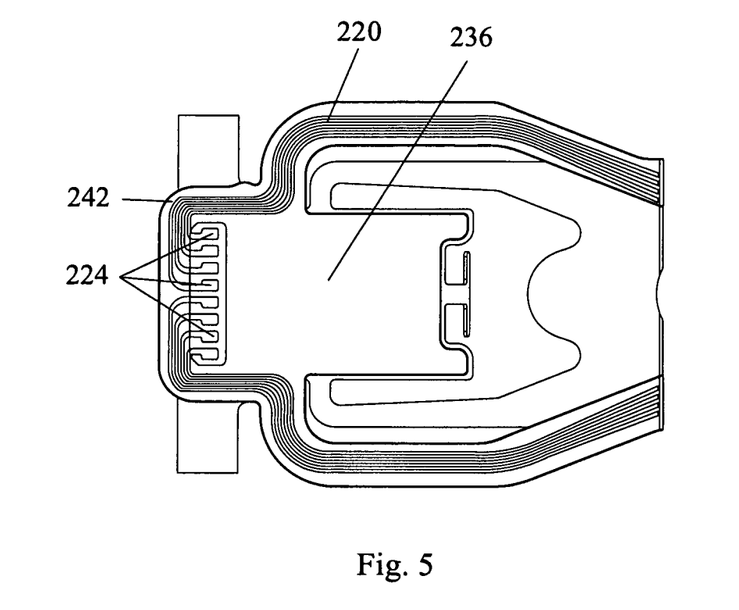
FIG. 5 is an enlarged partial plan view of the flexure according to a second embodiment of the present invention.
Figure 6:
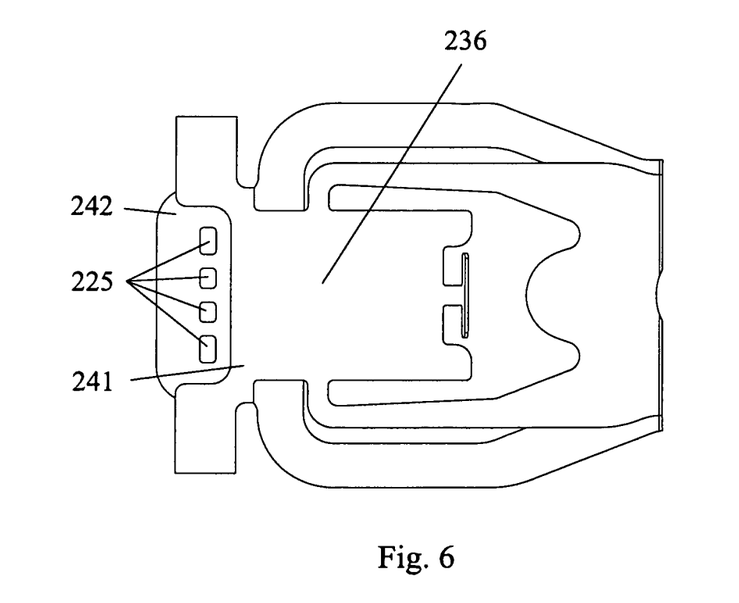
FIG. 6 is an enlarged partial bottom view of the flexure shown in FIG. 5.

FIGS. 5-6 illustrate a partial structure of the flexure 205, which show the top view and a bottom view of the suspension tongue 236 according to the second embodiment of the present invention. The laminated structure of the flexure 205 is changeless, which includes a stainless steel layer 241 and a dielectric layer 242. The top view of the suspension tongue 236 in the present embodiment is similar with the first embodiment, on which the eight bonding pads 224 are formed on the dielectric layer 242 at the top surface thereof. The modification of the second embodiment is that, four separate supporting pieces 225 are configured on the dielectric layer 242 at the bottom surface thereof and located at a corresponding position with the bonding pads 224, namely at direct backside of the bonding pads 224 for supporting. The four supporting pieces 225 are arranged in line that extends along the arranging direction of the bonding pads 224, which are isolated and separate each other. Preferably, the supporting pieces 225 are made of stainless steel. Comparing with the two supporting pieces 225, four supporting pieces 225 having spacing can release much stress generated during bonding the slider and each bonding pad 224 of the suspension tongue 236, thus the thermal deformation of the suspension tongue 236 is reduced, in turn, the crown change of the slider is reduced accordingly. Thereby, the flying stability of the slider is improved, and the reading/writing characteristics of the slider and the performance of entire disk drive unit are improved finally.

Figure 7:
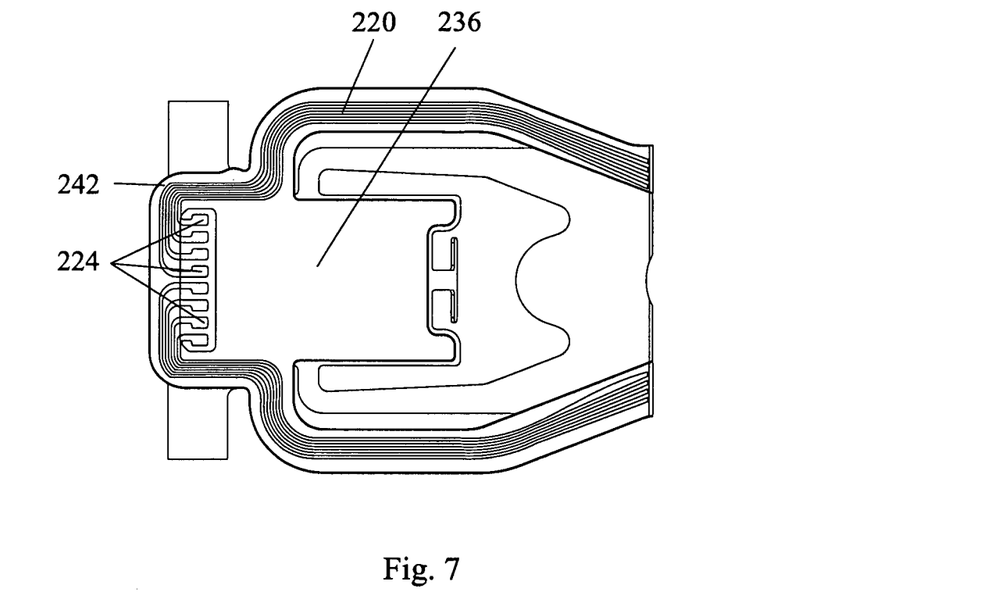
FIG. 7 is an enlarged partial plan view of the flexure according to a third embodiment of the present invention.
Figure 8:
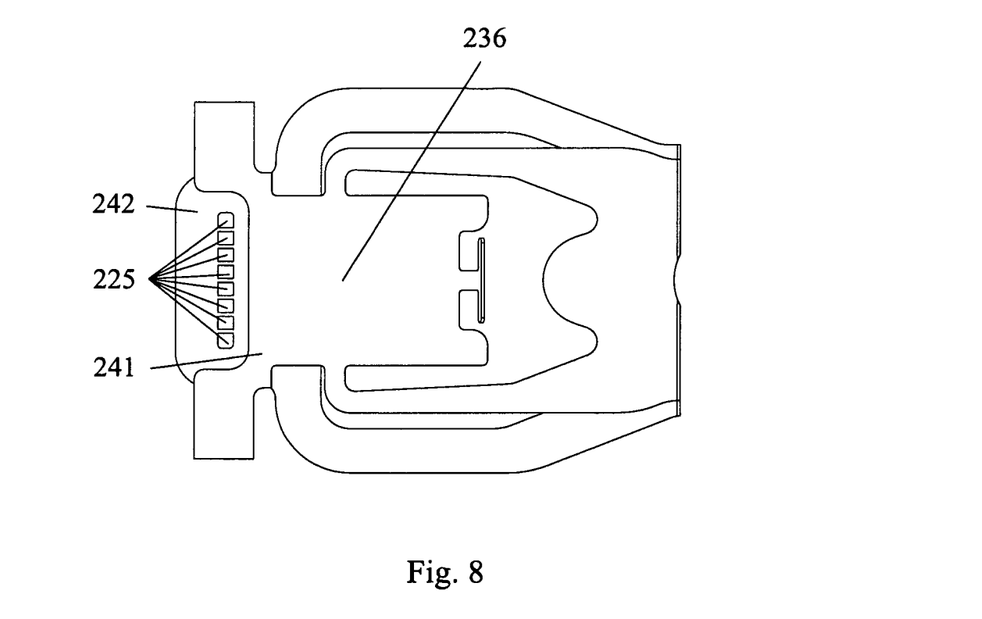
FIG. 8 is an enlarged partial bottom view of the flexure shown in FIG. 7.

FIGS. 7-8 show an exemplary embodiment of the suspension tongue 236 according the present invention. The present embodiment is similar with the two above-mentioned embodiments, but the difference is that, eight supporting pieces 225 are formed on the dielectric layer 242 at the bottom surface thereof. As shown in FIG. 8, the eight supporting pieces 225 are separate each other, and configured at direct backside of bonding pads 224. Each of supporting pieces 225 is mounted at the corresponding position with each of bonding pads 224 for supporting. When bonding the slider with the bonding pads 224, a high temperature is utilized to generate a thermal condition. As the eight supporting pieces 225 supports the bonding pads 224 rearwards, thus, the dielectric layer 242 is prevented from damaging under the thermal condition. Furthermore, stress generated while bonding the slider with each bonding pad 224 is dispersed on the each supporting piece 225, thus, the whole stress is reduced and released thereout, which reduces the thermal deformation of the suspension tongue 236, and the crown change of the slider accordingly. Thereby, the flying stability of the slider is improved, and the reading/writing characteristics of the slider and the performance of entire disk drive unit are improved finally.

It should be noticed that, the amount of the supporting pieces 225 is not limited in the above-mentioned embodiments; any other amounts can be arranged according to the actual demand.

Figure 9:
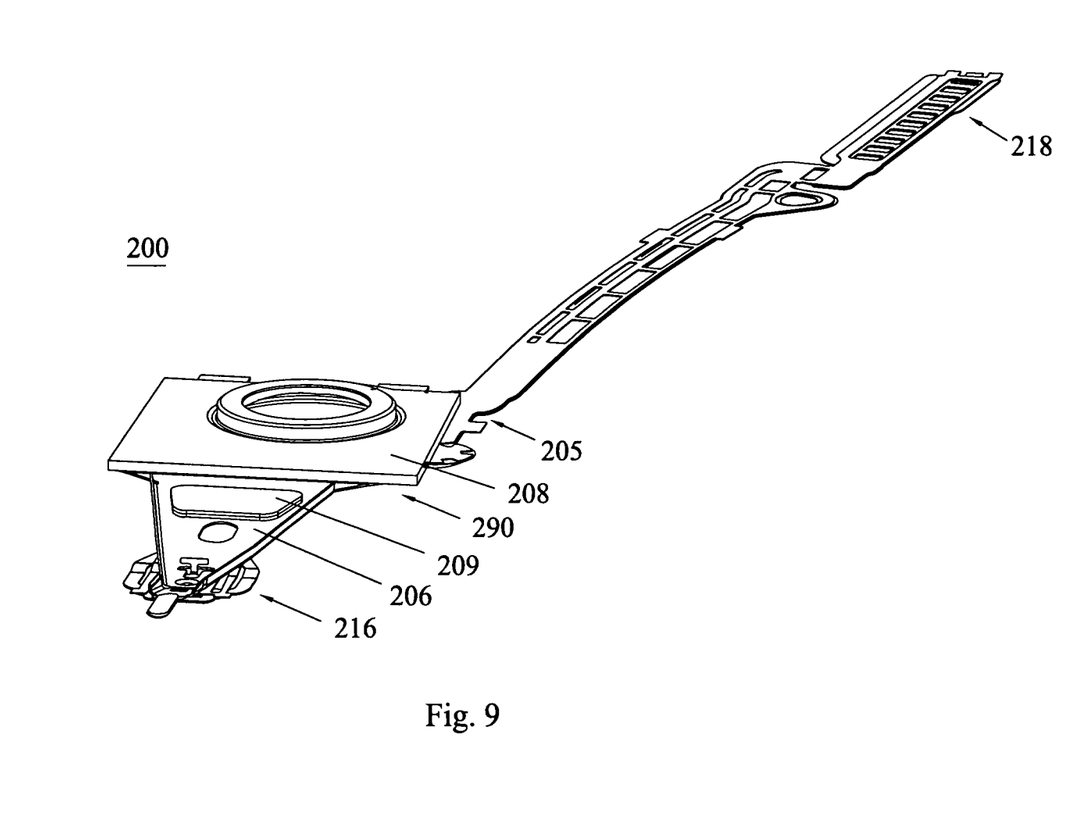
FIG. 9 is a perspective view of a HGA according to an embodiment of the present invention.

FIG. 9 shows a bottom view of a HGA 200 according to an embodiment of the invention comprises a suspension 290 and a slider (not shown here) carried on the suspension 290. The suspension 290 comprises a load beam 206, a base plate 208, a hinge 207 and the flexure 205, all of which are assembled with each other. The hinge 207 has a mounting hole 210 formed thereon to assemble the hinge 207 to the base plate 208. And then the slide is carried on the flexure 205. The type of the slider can be Pico slider with the conventional size, Pemto slider, U-Pemto slider or Femto slider with thinner size in turn. In the present embodiment, U-Pemto slider is utilized.

FIG. 10 shows a comparing table of the crown change of slider of HGA 200 between the prior art and the above-mentioned embodiments of the present invention. Two types of slider are particularized, as mentioned, the size of the U-Pemto slider is miniature than that of Pemto slider. It can be seen that, with the prior art design, the crown change of the U-Pemto slider is much tremendous than that of Pemto slider under 55 degree temperature. Concretely, the crown change of the Pemto slider is 0.41 nm, and the crown change of the U-Pemto slider is 0.71 nm. On the contrary, the crown change of the U-Pemto slider carried by the HGA of the present invention is much smaller. Such as, the crown changes of the U-Pemto slider of the three embodiments mentioned above are 0.44 nm, 0.34 nm and 0.32 nm. By all appearances, the thermal crown performance is improved significantly even using the thinner slider with the present invention. Thus, slider on the HGA of the present invention is more stable, and the flying height is easy to control and maintain, in turn, the reading and writing ability is stable, finally the dynamic reliability performance of disk drive unit is improved.

Figure 11:
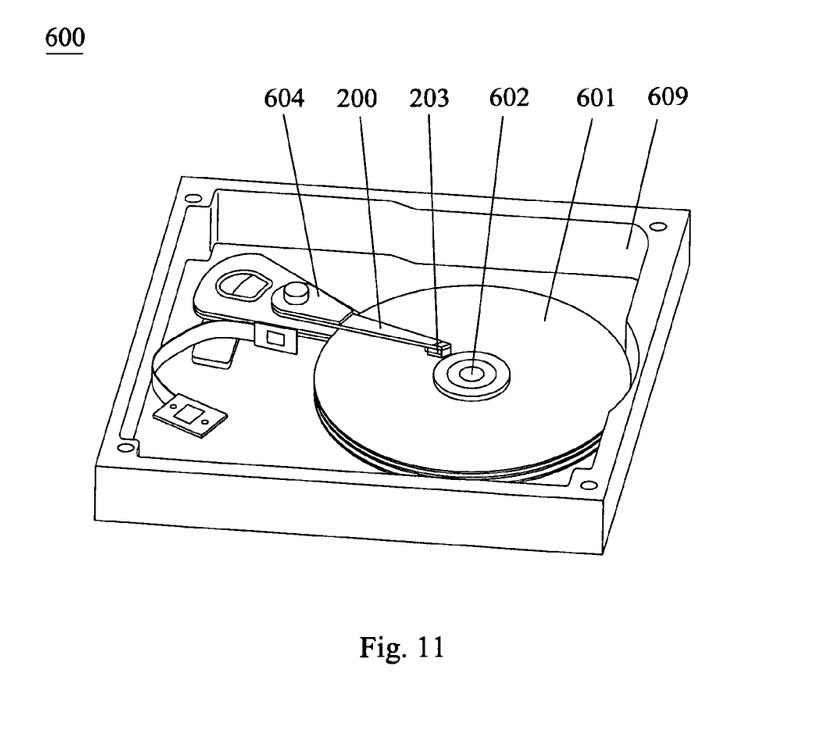
FIG. 11 is a perspective view of a disk drive unit according to an embodiment of the invention.

FIG. 11 is a disk drive unit according to an embodiment of the invention. The disk drive unit 600 comprises a HGA 200, a drive arm 604 connected to the HGA 200, a series of rotatable disks 601, and a spindle motor 602 to spin the disk 601, all of which are mounted in a housing 609. As described, the HGA 200 comprises a suspension 290 having a flexure 205 and a slider 203. Because the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A suspension for a head gimbal assembly, comprising: a flexure having a suspension tongue arranged for supporting a slider, which comprises a stainless steel layer and a dielectric layer formed thereon, wherein the dielectric layer has a top surface and bottom surface, a plurality of bonding pads are formed on the top surface at a leading portion of the suspension tongue and arranged for connecting with the slider, and at least two separate supporting pieces are formed on the bottom surface and located at a corresponding position with the bonding pads, shaped, arranged, and located to release stress generated on the bonding pads.

2. The suspension according to claim 1, wherein 2 to 8 supporting pieces are formed.

3. The suspension according to claim 1, wherein the supporting piece is made of stainless steel.

4. The suspension according to claim 1, wherein the dielectric layer is made of polyimide.

5. The suspension according to claim 1, wherein the stainless steel layer is formed on the bottom surface of the dielectric layer.

6. A head gimbal assembly, comprising:
a slider; and
a suspension comprising a flexure with a suspension tongue for supporting the slider;
wherein the flexure comprises a stainless steel layer and a dielectric layer formed thereon, wherein the dielectric layer has a top surface and bottom surface, a plurality of bonding pads are formed on the top surface at a leading portion of the suspension tongue and arranged for connecting with the slider, and at least two separate supporting pieces are formed on the bottom surface and located at a corresponding position with the bonding pads, thereby releasing stress generated on the bonding pads.

7. The head gimbal assembly according to claim 6, wherein 2 to 8 supporting pieces are formed.

8. The head gimbal assembly according to claim 6, wherein the supporting piece is made of stainless steel.

9. The head gimbal assembly according to claim 6, wherein the dielectric layer is made of polyimide.

10. The head gimbal assembly according to claim 6, wherein the stainless steel layer is formed on the bottom surface of the dielectric layer.

11. A disk drive unit, comprising:
a head gimbal assembly including a slider and a suspension that supports the slider;
a drive arm connected to the head gimbal assembly;
a disk; and
a spindle motor operable to spin the disk;
the suspension comprising:
a flexure having a suspension tongue arranged for supporting a slider, which comprises a stainless steel layer and a dielectric layer formed thereon, wherein the dielectric layer has a top surface and bottom surface, a plurality of bonding pads are formed on the top surface at a leading portion of the suspension tongue and arranged for connecting with the slider, and at least two separate supporting pieces are formed on the bottom surface and located at a corresponding position with the bonding pads, thereby releasing stress generated on the bonding pads.

* * * * *